(12) United States Patent
Mueller

(10) Patent No.: US 8,601,145 B2
(45) Date of Patent: Dec. 3, 2013

(54) INTER-PROCESSOR COMMUNICATION LINK WITH MANAGEABILITY PORT

(75) Inventor: Peter D. Mueller, Fair Oaks, CA (US)

(73) Assignee: Marvell International Ltd., Hamilton (BM)

( * ) Notice: Subject to any disclaimer, the term of this patent is extended or adjusted under 35 U.S.C. 154(b) by 260 days.

(21) Appl. No.: 12/796,504

(22) Filed: Jun. 8, 2010

(65) Prior Publication Data
US 2010/0250821 A1 Sep. 30, 2010

Related U.S. Application Data

(63) Continuation of application No. 10/812,301, filed on Mar. 29, 2004, now Pat. No. 7,734,797.

(51) Int. Cl.
*G06F 15/16* (2006.01)

(52) U.S. Cl.
USPC ........... 709/229; 709/222; 709/223; 719/318; 719/319; 719/321; 710/15; 712/29; 713/310; 714/30; 714/4.4; 714/5.1; 714/5.11; 714/10; 455/423

(58) Field of Classification Search
USPC ......... 709/229, 208–212, 217, 220–226, 200; 370/462; 710/15–19; 714/5, 9, 30, 44; 712/29, 227; 718/1, 100–104; 719/311–313, 318–327, 310; 455/420
See application file for complete search history.

(56) References Cited

U.S. PATENT DOCUMENTS

| | | | |
|---|---|---|---|
| 4,914,653 A * | 4/1990 | Bishop et al. ................. | 370/462 |
| 5,469,542 A * | 11/1995 | Foster et al. .................. | 709/224 |
| 5,832,205 A * | 11/1998 | Kelly et al. ..................... | 714/53 |
| 5,841,988 A | 11/1998 | Chennubhotla et al. | |
| 5,909,546 A | 6/1999 | Osborne | |
| 5,951,683 A * | 9/1999 | Yuuki et al. ....................... | 713/1 |
| 5,978,912 A * | 11/1999 | Rakavy et al. .................... | 713/2 |
| 6,035,422 A * | 3/2000 | Hohl et al. ....................... | 714/35 |
| 6,065,078 A * | 5/2000 | Falik et al. ..................... | 710/100 |
| 6,067,407 A * | 5/2000 | Wadsworth et al. .......... | 709/224 |
| 6,122,756 A * | 9/2000 | Baxter et al. .................... | 714/30 |
| 6,446,192 B1 * | 9/2002 | Narasimhan et al. ........... | 712/29 |
| 6,526,501 B2 | 2/2003 | Edwards et al. | |
| 6,543,002 B1 | 4/2003 | Kahle et al. | |
| 6,665,737 B2 | 12/2003 | Edwards | |
| 6,681,342 B2 * | 1/2004 | Johnson et al. ................. | 714/30 |
| 6,742,113 B1 * | 5/2004 | Yamada ......................... | 712/244 |
| 6,745,321 B1 * | 6/2004 | Floyd et al. .................... | 712/227 |
| 6,757,725 B1 * | 6/2004 | Frantz et al. ................... | 709/223 |
| 6,965,935 B2 | 11/2005 | Diong | |
| 7,164,904 B2 * | 1/2007 | Nagy et al. ..................... | 455/403 |
| 7,324,815 B2 * | 1/2008 | Ross et al. ..................... | 455/425 |
| 7,509,375 B2 * | 3/2009 | Christian et al. .............. | 709/205 |
| 2002/0091826 A1 | 7/2002 | Comeau et al. | |
| 2002/0116554 A1* | 8/2002 | Bormann et al. ............... | 710/15 |

(Continued)

OTHER PUBLICATIONS

"Recovering Internet Service Sessions from Operating System Failures", by F Sultan, A Bohra, S Smaldone, Y Pan, P Gallard, I Neamtiu, L Iftode, IEEE Internet Computing, Mar. 2005, pp. 17-26.*

(Continued)

*Primary Examiner* — Greg C Bengzon

(57) ABSTRACT

Manageability ports for inter-processor communication links, along with associated systems and methods, are generally provided.

15 Claims, 5 Drawing Sheets

(56) References Cited

U.S. PATENT DOCUMENTS

| | | | |
|---|---|---|---|
| 2003/0046377 A1* | 3/2003 | Daum et al. | 709/223 |
| 2004/0117510 A1* | 6/2004 | Arimilli et al. | 709/253 |
| 2005/0010925 A1* | 1/2005 | Khawand et al. | 719/310 |
| 2005/0018929 A1 | 1/2005 | Lippincott | |
| 2005/0027897 A1* | 2/2005 | Fellenser et al. | 710/15 |
| 2005/0044221 A1* | 2/2005 | Venkatanarayan et al. | 709/225 |
| 2005/0078620 A1 | 4/2005 | Balachandran et al. | |
| 2005/0186909 A1 | 8/2005 | Gupta | |

OTHER PUBLICATIONS

Remote Repair of Operating System State using Backdoors, by F Sultan, A Bohra, P Gallard, I Neamtiu, L Iftode, International Conference on Autonomic Computing 2004, IEEE Computer Society.*
Remote Repair of Operating System State using Backdoors, by F Sultan, A Bohra, P Gallard, I Neamtiu, L Iftode, Rutgers University, Technical Report TR-524, Dec. 2003.*

* cited by examiner

INTER-PROCESSOR COMMUNICATION LINK WITH MANAGEABILITY PORT

INCORPORATION BY REFERENCE

This is a Continuation of application Ser. No. 10/812,301 filed Mar. 29, 2004. The disclosure of the prior application is hereby incorporated by reference herein in its entirety.

TECHNICAL FIELD

This application relates generally to microprocessors and, more particularly, to a microprocessor manageability port that uses at least one predetermined channel of a multi-channel inter-processor communication link.

BACKGROUND

Microprocessors are capable of being used in a large number of embedded applications, such as automobiles, appliances, stereo systems, watches, personal digital assistants (PDAs), smart industrial machines and smart phones. In many of these embedded applications, microprocessors have an increasing need to exchange large amounts of data with other microprocessors, system-level peripherals and external servers. Data examples include command and control information, database information, streaming data and large file transfer. Multi-channel communication links can be used for inter-processor communications. One example of a multi-channel inter-processor communication link, also referred to as a processor-to-processor communications interface, is the Intel® Multiple Scalable 20 Link (MSL) communication link technology. In addition to the increased data transfer demands, the amount and complexity of microprocessor code also increases as the applications increase in sophistication.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. Additionally, various embodiments can be combined to provide other embodiments. The following detailed description is, therefore, not to be taken in a limiting sense, and the scope is defined only by the appended claims, along with the full scope of legal equivalents to which such claims are entitled.

Figure 1:
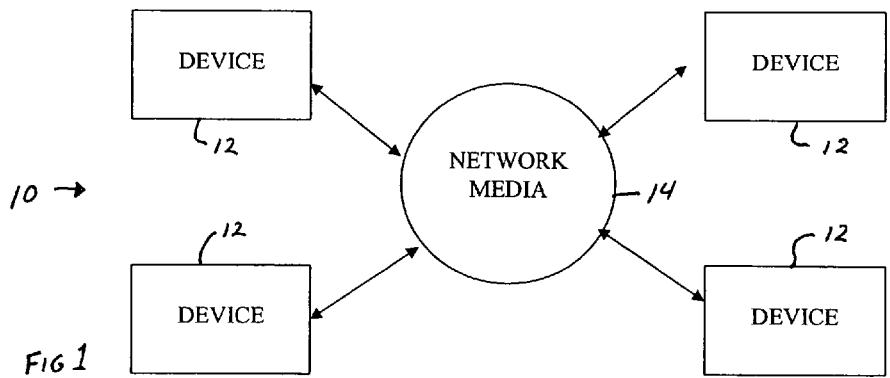
FIG. 1 illustrates a wireless network that includes wireless devices having a management port, according to various embodiments of the present subject matter.

FIG. 1 illustrates a wireless network that includes wireless devices having a management port, according to various embodiments of the present subject matter. The illustrated network includes four devices 12 capable of communicating with each other in a wireless network. The wireless network can include fewer or more wireless devices. The illustrated wireless devices 12 are networked together through network media 14, as generally illustrated in FIG. 1. The specifics of the network media depend on the employed communication technology. For example, various network media embodiments include transmitters, receivers, routers, repeaters, satellites, communication cables and other systems to provide an infrastructure on which to support network communication between or among the wireless devices. However, the devices wirelessly communicate with the network. Thus, the wireless devices are not tethered by a communication cable and are mobile, or relatively mobile, within the network. According to various embodiments, the wireless devices wirelessly communicate using radio frequency (RF) transmitters and radios. Examples of wireless devices includes, but are not limited to, laptop or handheld computers, PDAs and telephones. Various embodiments provide unicast, multicast and/or broadcast capabilities.

These wireless devices can include a microprocessor system with a manageability port of the present subject matter. Such devices are continuing to be designed with more and more functions, and thus often implement modular microprocessor systems to implement the desired functions. A manageability port provides desirable capabilities in more complex systems. The manageability port of the present subject is not limited to implementations in wireless devices, but can be used in other embedded microprocessor systems which use multi-channel inter-processor communication links. Such microprocessor systems can be found in a variety of industrial and commercial products, in addition to the examples of wireless devices provided above.

Various device embodiments provide a variety of functions. Various device embodiments include an applications subsystem for implementing various database and multimedia applications and separate communications subsystems for implementing wireless communications. For example, some cellular phone embodiments have an embedded general applications processor to manage database applications and an embedded baseband processor to support a communications platform such as GPRS (General Packet Radio Service) or CDMA (Code Division Multiple Access). Various device embodiments include other features such as CMOS digital imaging, World Wide Web (WWW) access, and multimedia processing. Additionally, some embedded microprocessor support communication platforms such as WCDMA (Wideband Code Division Multiple Access), IEEE 802.11, Bluetooth® and the like for wireless applications.

Recently, particular attention has been paid to providing a high-speed, reliable standard for an inter-processor communications interface. For example, such an interface can be used to provide a multi-channel communication link between an embedded general purpose applications processor and a baseband processor. Some desired features for an inter-processor communications link include high inter-processor data transmission rates, scalability for increasing bandwidth, quality of service (QoS), security and the elimination of data exchange bottlenecks. Additionally, an inter-processor communications link for handheld wireless devices also has significant packaging and power consumption constraints. Fast data transmission improves the responsiveness of applications. Another reason to desire fast data transmission is to reduce the power consumption for mobile devices, since power is consumed during data transmission.

The manageability port of the present subject matter enables remote manageability over a network, which allows network operators or managers to access and debug problems, even if the applications processor is not functioning. Given the movement of data and applications into the cellular and PDA technology, for example, this remote manageability can reduce the total cost of ownership (TCO). An external device, such as a baseband or microcontroller, is able to access the memory, configuration registers and peripherals, for example, of the applications processor even if the processor is hung. A management block is added to an inter-processor communication link interface. When enabled and configured by software, an inbound channel is used to accept commands and load them into a command register. The command is driven on the internal system bus to access either configuration register values, internal memory, external memory and/or peripherals. The return value is loaded into the response register, which is sent to the external device via an outbound channel.

Figure 2:
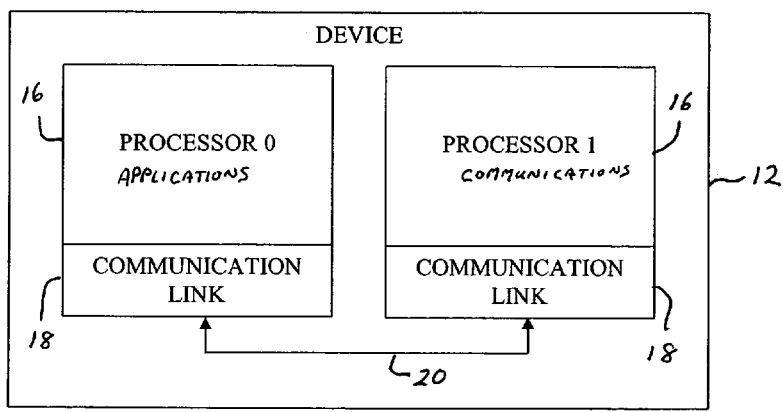
FIG. 2 illustrates a wireless device such as illustrated in FIG. 1, including two embedded microprocessor systems with peer-to-peer, multi-channel inter-processor communication links, according to various embodiments of the present subject matter.

FIG. 2 illustrates a wireless device 12 such as illustrated in FIG. 1, including two embedded microprocessor systems 16 with peer-to-peer, multi-channel inter-processor communication links 18, according to various embodiments of the present subject matter. Multi-channel inter-processor communication is generally illustrated using line 20. In various embodiments, one of the embedded microprocessor systems includes an applications processor, and the other includes a communications processor. In various embodiments, the communications processor is connected to a substantially omni-directional antenna. In various embodiments, the communications processor is connected to a substantially directional antenna. For example, some embodiments of applications processor for a radio telecommunications device such as a radio telephone or PDA performs applications such as database applications, World Wide Web surfing, and/or multimedia processing. Some embodiments of a communications processor for the radio telecommunications device include a baseband processor device. Various embodiments of the baseband processor device is adapted to support GPRS technology. Various embodiments of the baseband processor device is adapted to support WCDMA technology. The present subject matter is not limited to a particular communications technology. The Intel® MSL communication link is capable of providing a peer-to-peer, multi-channel inter-processor communication link.

Figure 3:
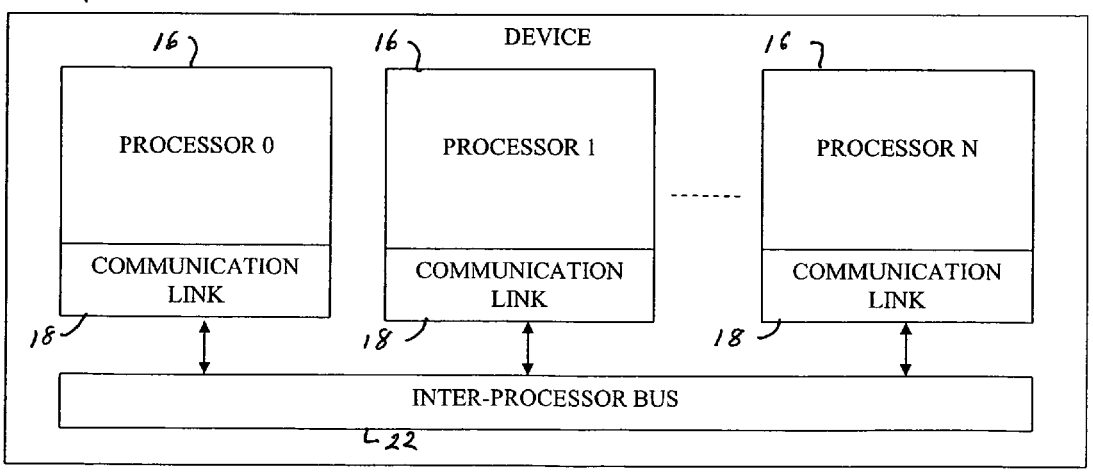
FIG. 3 illustrates a wireless device such as illustrated in FIG. 1, including a plurality of microprocessor systems with multi-point, multi-channel inter-processor communication links, according to various embodiments of the present subject matter.

FIG. 3 illustrates a wireless device 12 such as illustrated in FIG. 1, including a plurality of microprocessor systems 16 with multi-point, multi-channel inter-processor communication links 18, according to various embodiments of the present subject matter. The illustrated device includes at least three processors (Processor 0, Processor 1 and Processor N), and further includes an inter-processor communications bus 22. The Intel® MSL communication link is capable of providing a multi-point, multi-channel inter-processor communication link. These communication links manage access to the channels and allows any processor to communicate with one or more processors in the device.

The MSL communication link includes a physical link and a data link layer. The MSL physical interface includes a pair of unidirectional, high-speed links that function as an outbound link and an inbound link for inter-processor communication. The physical interface further includes multiple logical channels for sending and receiving both packet-based and streaming transfers such as those for multimedia data and voice communications. The MSL specification provides sixteen logical channels for each of the outbound and inbound links, seven of which are dedicated to handling data streams. System software can configure the link to use fewer than the seven data channels. The channels are multiplexed over their respective physical link, but are independent and do not interact with each other. Each of these channels can be assigned priorities to address the needs for managing QoS, with multiple data streams. Each data channel contains a FIFO (first in, first out) queue for sending and receiving data across the link.

The MSL data-link layer provides general framing and packetization capabilities over a full-duplex link. Data exchanges can be either packet or bit based data transfers using Acknowledged and Unacknowledged packet data serves or an isochronous stream, as well as a 3GPP (3rd Generation Partnership Project) style of QoS. Because of hardware flow control capabilities, the physical link is reliable and does not require CRC (Checksum)/FCS (Frame Check Sequence) capabilities. The MSL data-link layer software provide a number of functions, including Logical Link Control, Physical Link Control, and Physical Link Manager. The Logical Link Control provides general framing to higher layer packets and helps establish and terminate logical connections. The Physical Link Control layer multiplexes higher layer packets over the available MSL physical channels and provides the QoS functionality. The Physical Link Manager layer interfaces with low-level platform elements, and is involved with physical bus management, send/receive DMA (direct memory access) transfers, bus configuration and power management.

One example of a microprocessor that is capable of being used in these embedded processor systems is the Intelit XScaleTm microprocessor. Other examples of microprocessor systems include IEEE 802.11x components, GSM (Global System for Mobile communications)/GPRS (General Packet Radio Service) baseband radio components, and CCD (camera imaging charge coupled devices) components. The present subject matter can be implemented with other microprocessor components. According to various embodiments, the processors illustrated in FIGS. 2 and 3 are provided on separate semiconductor chips. According to various embodiments, the processors are embedded in the same semiconductor die.

Figure 4:
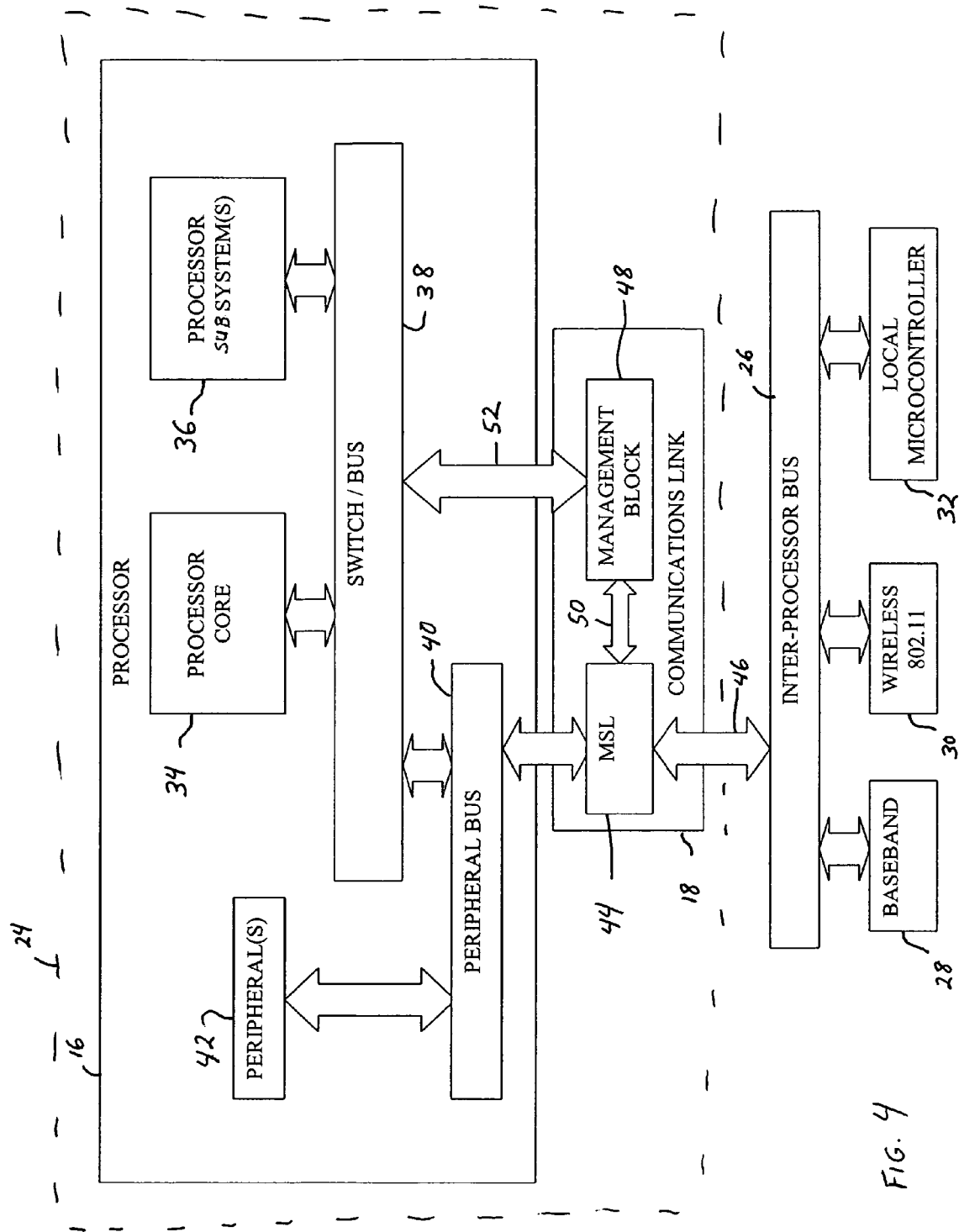
FIG. 4 illustrates a device that includes a microprocessor system with a management port, according to various embodiments of the present subject matter.

FIG. 4 illustrates a device that includes a microprocessor system with a management port, according to various embodiments of the present subject matter. The illustrated embedded microprocessor system 24 includes a processor 16 and an inter-processor, multi-channel communications link 18. The illustrated device 24 further includes an inter-processor bus 26 for use in inter-processor communications. The device further includes at least one other microprocessor system connected to the inter-processor bus and adapted to provide inter-processor communications. The illustrated device includes a baseband microprocessor system 28, a WLAN (wireless local area network) microprocessor system 30, and a local microcontroller 32. The illustrated systems are provided as examples. The illustrated device can have the microprocessor systems shown in the figure, fewer than those shown, more than those shown, and other than those shown in the figure. Various embodiments of the baseband microprocessor system 28 are adapted to wirelessly communicate with at least one other device using cellular radio technology, such as GPRS technology, CDMA technology, WCDMA technology, and the like. Various embodiments of the WLAN microprocessor system 30 are adapted to wirelessly communicate with at least one other device using IEEE 802.11x technology. Various embodiments of the microcontroller provide multimedia functions.

The illustrated local microprocessor system 16, which is the microprocessor that is local to the illustrated inter-processor communications link, includes a processor core 34 and processor subsystem device(s) 36 connected via a microprocessor bus or switch 38. The illustrated system 16 includes a peripheral bus 40 connected to the microprocessor bus 38, and further includes peripheral device(s) 42 connected to the peripheral bus 40. The processor core 34 is able to control or otherwise access the processor subsystem device(s) 36 and the peripheral device(s) 42 using buses 38 and 40.

The illustrated communications link system 16 includes an inter-processor communication link 44 to provide a multi-channel inbound link and a multi-channel outbound link (illustrated by the bi-directional arrow 46), and to control data flow over a plurality of channels for both the inbound and outbound links. The illustrated inter-processor communication link 44 is an Intel® MSL communication link. However, the present subject matter is not limited to a particular inter-processor communication link. The inter-processor communication link system is connected to and adapted to provide communications signals on a bus of the microprocessor system. FIG. 4 illustrates an inter-processor communication link 44 that is connected to the peripheral bus 40 of the microprocessor system.

The illustrated communications link system includes a management block 48 that functions as a manageability port to the microprocessor system 16. The management block is adapted to receive command data using a predetermined inbound logic channel in the inbound link and generate a corresponding command signal on the microprocessor bus to perform a management function for at least one of the processor core 34 and the at least one processor subsystem 36. The management block is also adapted to receive a response signal from the bus and transmit corresponding response data through a predetermined outbound logic channel in the outbound link. Signals containing the predetermined inbound logic channel and the predetermined outbound logic channel are illustrated by the bidirectional arrow at 50. Signals to and from the bus are illustrated by the bi-directional arrow at 52.

Figure 5:
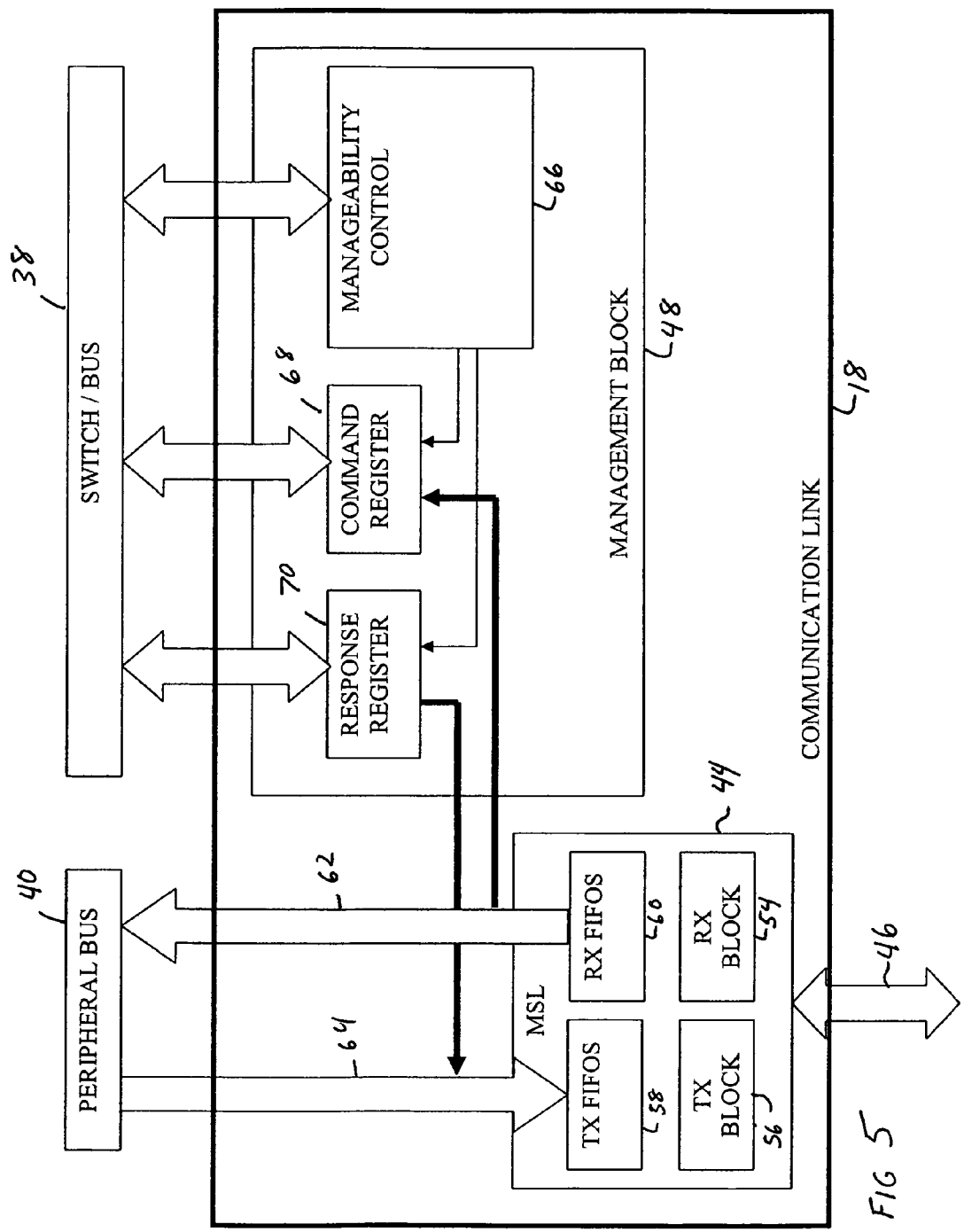
FIG. 5 illustrates an inter-processor communication link system that includes a management port, according to various embodiments of the present subject matter.

FIG. 5 illustrates an inter-processor communication link system 18 that includes a management port, according to various embodiments of the present subject matter. The system 18 includes an inter-processor communication link 44, illustrated as an Intel® MSL multi-channel, inter-processor communication link, and further includes a management block 48 that, in conjunction with the communication link 44, functions as a management port. The figure also illustrates a microprocessor bus 38 and peripheral bus 40 for an embedded microprocessor system.

The inter-processor communication link 44 receives a multi-channel inbound link and a multi-channel outbound link. The combination of the inbound and outbound links are represented by a bi-directional arrow 46. The communication link includes a receive block 54 and a transmit block 56. These blocks provide the physical links and further provide the appropriate data-link protocol to control data flow through the multiple channels of the inbound and outbound links. The illustrated Intel® MSL multi-channel, inter-processor communication link includes sixteen logical channels for each of the outbound and inbound links, seven of which are dedicated to handling data streams. System software can configure the link to use fewer than the seven data channels. The channels are multiplexed over their respective physical link, but are independent and do not interact with each other. The present subject matter is not limited to communication links having a particular number of channels. The communication link 44 further includes transmit FIFOS 58 and receive FIFOS 60. Each data channel in the inbound and outbound links provides a FIFO (first in, first out) queue for sending and receiving data across the link. The inter-processor communication link is adapted to transmit signals, represented at 62, corresponding to the inbound link over a microprocessor bus and to receive signals, represented at 64, corresponding to the outbound link from a microprocessor bus. The figure illustrates that the signals corresponding to the inbound link are transmitted over a peripheral microprocessor bus 40.

The management block 48 includes a manageability control module 66, a command register 68, and a response register 70, each of which are illustrated to communicate over a microprocessor bus 38. The management block is adapted to receive command data using a predetermined logic channel in the inbound link and generate a corresponding command signal on the bus to perform a management function for the microprocessor system (e.g. a management function for a processor core, processor subsystem(s) and/or peripheral(s)). The management block is further adapted to receive a response signal from the bus and transmit corresponding response data through a predetermined logic channel in the outbound link.

The data flow from the inter-processor communication link to the command register uses at least one predetermined channel in the inbound link of the inter-processor communication signal, and the data stored in the command register is able to be transmitted over the microprocessor bus. The data flow from the response register to the inter-processor communication link is able to be received from a signal on the microprocessor bus and transmitted as part of an inter-processor communication signal using at least one predetermined channel in the outbound link. The manageability control module applies an appropriate protocol to communicate over the bus to perform a management function on the processor core, processor subsystem(s), and/or peripheral(s). Examples of management functions include a debug function. Other examples of management functions include accessing memory, accessing configuration registers, and accessing a peripheral device such as a serial port. Accessing memory, for example, includes the ability to both read and write to the memory. The manageability port allows another microprocessor system to perform these functions in an embedded microprocessor system using a "back door." These function can be performed even when the microprocessor core is hung, such as may occur due to the complex functions being performed and the large amount of data being processed by the microprocessor system.

Figure 6:
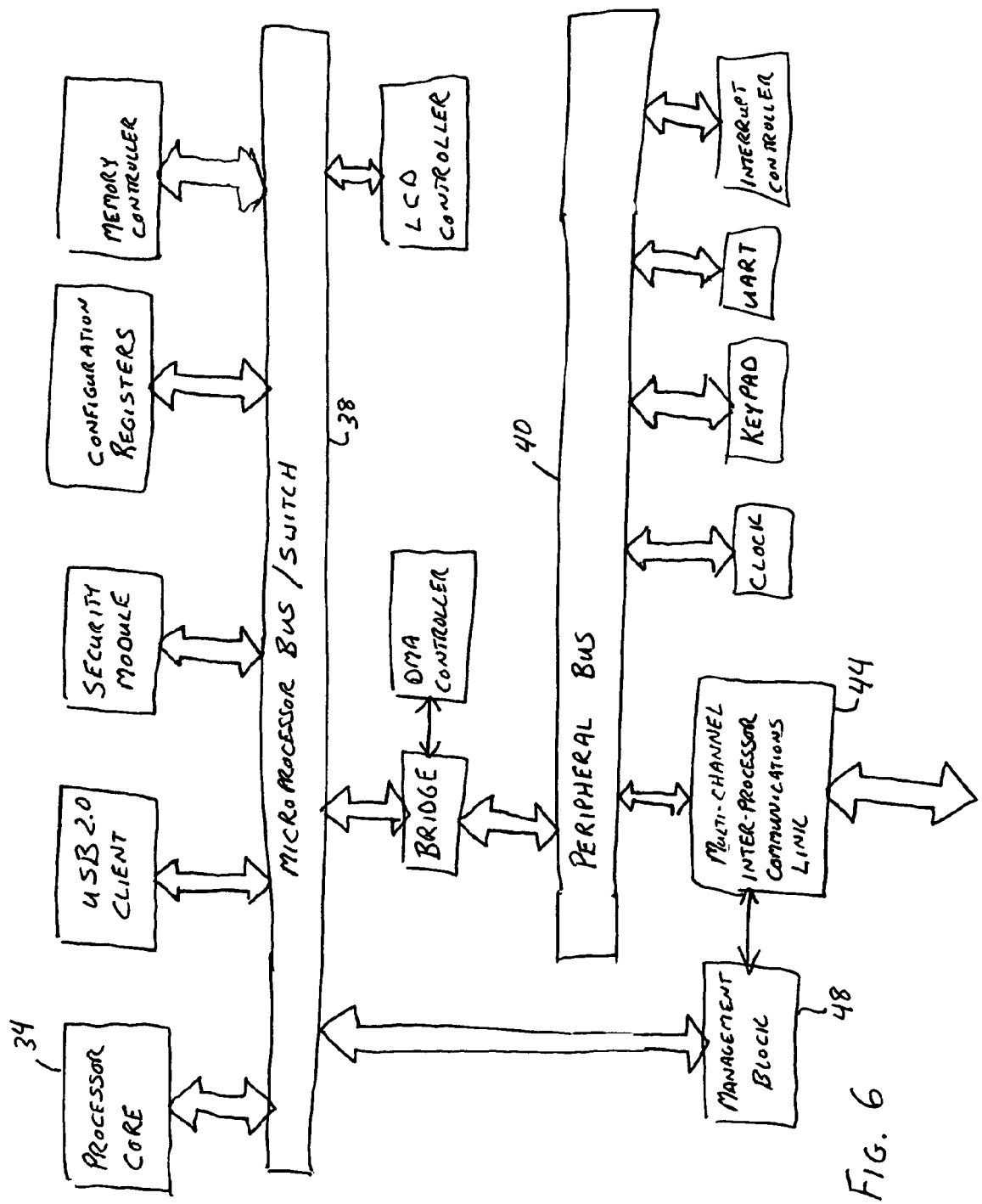
FIG. 6 illustrates a processor system including some processor subsystems and peripherals, according to various embodiments of the present subject matter.

FIG. 6 illustrates a processor system including some processor subsystems and peripherals, according to various embodiments of the present subject matter. The illustrated system includes a multi-channel inter-processor communications link 30 44 and a management block 48, such as was illustrated in FIG. 5. FIG. 6 also illustrates a processor core 34 connected to microprocessor bus 38, and further illustrates a peripheral bus 40. Examples of processor subsystems include, but are not limited to, a USB 2.0 client, a security module, configuration registers, a memory controller and a LCD (liquid crystal display) controller. Examples of processor peripherals include, but are not limited to, a clock, a keypad, a UART (Universal Asynchronous Receiver Transmitter), and an interrupt controller. The figure also illustrates a bridge connecting the peripheral bus to the microprocessor bus, and a DMA (direct memory access) controller. Various embodiments of the present subject matter enable some or all of these devices to be debugged or otherwise managed from another microprocessor system through a manageability port that uses the management block and predetermined channels in the inbound and outbound links.

Figure 7:
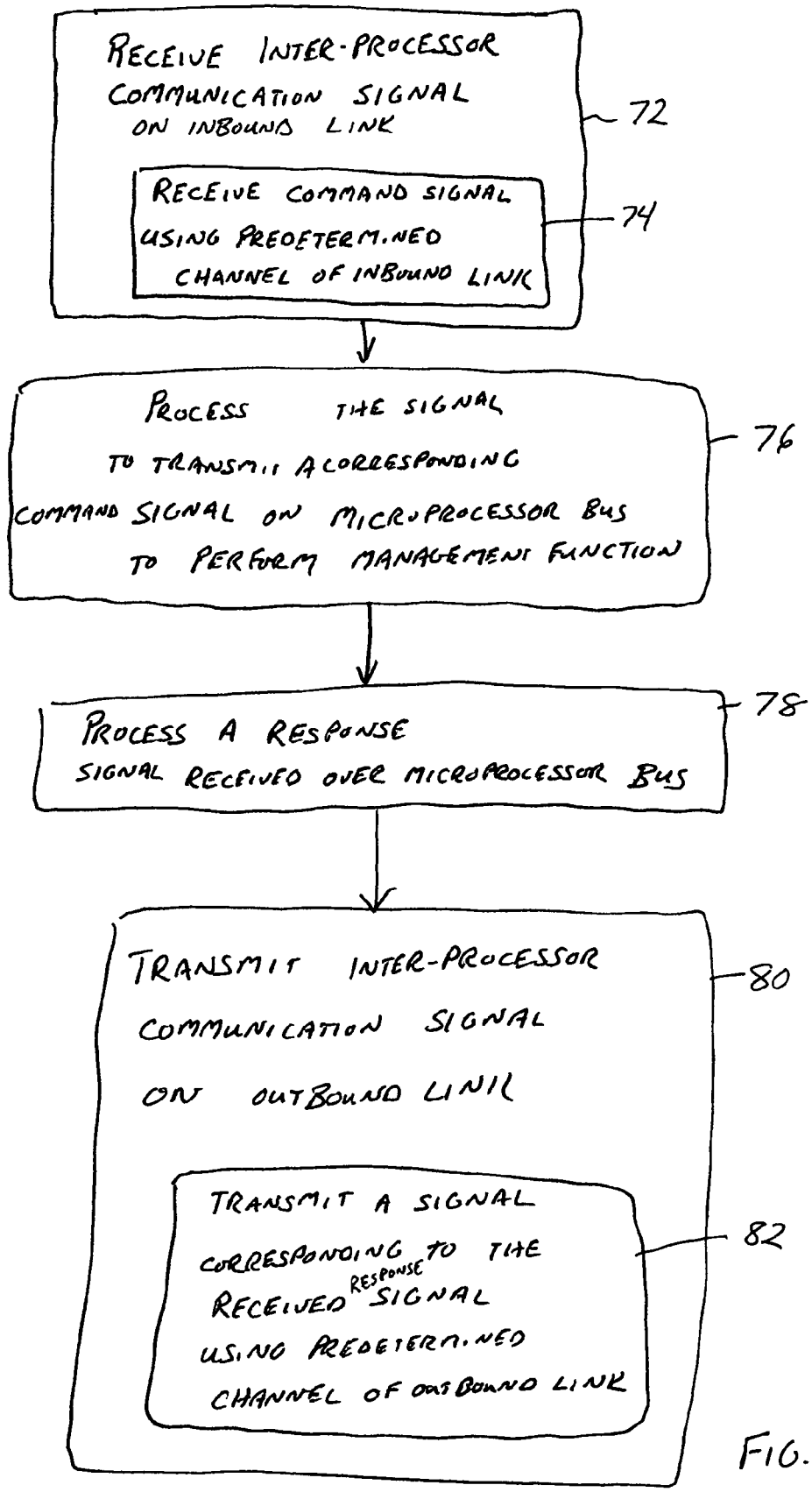
FIG. 7 illustrates a method for managing a microprocessor system through a management port, according to various embodiments of the present subject matter.

FIG. 7 illustrates a method for managing a microprocessor system through a management port, according to various embodiments of the present subject matter. At 72, an inter-processor communication signal is received on an inbound link. A command signal is received through the inter-processor communication signal using a predetermined channel of the inbound link, as represented at 74. At 76, the signal is processed to transmit a corresponding command signal on the microprocessor bus to perform a desired management function within a local microprocessor system. The management function can be performed on a processor core, processor subsystem(s), and/or peripheral(s). Some management functions reply or generate a response the management funCtion. A response signal is received over the microprocessor bus. At 78, the response signal is processed. At 80, an inter-processor communication signal is transmitted on an outbound link. A signal corresponding to the received response signal is transmitted using a predetermined channel of the outbound link, as illustrated at 82.

One of ordinary skill in the art will understand that, the modules and other circuitry shown and described herein can be implemented using software, hardware, and combinations of software and hardware. As such, the term module is intended to encompass software implementations, hardware implementations, and software and hardware implementations.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined to form other embodiments. In various embodiments, the methods provided above are implemented as a computer data signal embodied in a carrier wave or propagated signal, that represents a sequence of instructions which, when executed by a processor cause the processor to perform the respective method. In various embodiments, methods provided above are implemented as a set of instructions contained on a computer-accessible medium capable of directing a processor to perform the respective method.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments as well as combinations of portions of the above embodiments in other embodiments will be apparent to those of skill in the art upon reviewing the above description. The scope of the present subject matter should be determined with reference to the appended claims, along with the full scope of equivalents to which such claims are entitled.

What is claimed:

1. An inter-processor communication link system for a wireless device platform, comprising:
    first and second microprocessor subsystems configured to support the wireless device platform for wireless applications;
    a manageability control module configured to apply a protocol for communicating over a microprocessor bus of the first microprocessor subsystem, the second microprocessor subsystem accessing the manageability control module, the manageability control module performing a management function on the first microprocessor subsystem, even when a processor core of the first microprocessor subsystem is not responsive to any signal; and
    an inter-processor communication link configured to provide at least a bi-directional communication path to and from at least one peripheral bus of the first microprocessor subsystem;
    a wireless device including the first and second microprocessor subsystems, the manageability control module, and the inter-processor communication link;
    a first multi-channel link of the inter-processor communication link configured to receive communications from the at least one peripheral bus of the first microprocessor subsystem:
    a second multi-channel link of the inter-processor communication link configured to transmit communications to the at least one peripheral bus of the first microprocessor subsystem: and
    a predetermined channel of an inbound link of the inter-processor communication link configured to receive a communication used to perform the management function.

2. The inter-processor communication link system according to claim 1, wherein the inter-processor communication link includes a data link protocol configured to control data flow over the first and second multi-channel links.

3. The inter-processor communication link system according to claim 1, further comprising:
    a command register configured to store command data delivered through the inter-processor communication link; and
    a response register configured to store response data from the microprocessor bus.

4. The inter-processor communication link system according to claim 3, wherein
    the manageability control module is connected with the command register and the response register, the manageability control module configured to determine when the command data is received at the command register, transmit a corresponding command signal over the microprocessor bus, receive a response signal from the microprocessor bus, store a corresponding response data at the response register, and transmit the corresponding response data through the inter-processor communication link.

5. The inter-processor communication link system according to claim 4, wherein
    the corresponding command signal is configured to perform the management function for the first microprocessor subsystem.

6. The inter-processor communication link system according to claim 1, wherein the management function includes debugging.

7. The inter-processor communication link system according to claim 1, wherein the management function includes accessing a memory.

8. The inter-processor communication link system according to claim 1, wherein the management function includes accessing configuration registers.

9. The inter-processor communication link system according to claim 1, wherein the management function includes accessing a peripheral device of the first microprocessor subsystem.

10. A method for linking communications between processors for a wireless device, comprising:
supporting the wireless device for wireless applications, the wireless device including a first and second microprocessor subsystems, a manageability control module, and an inter-processor communication link;
applying a protocol for communicating over a microprocessor bus of the first microprocessor subsystem;
performing by the manageability control module a management function on the first microprocessor subsystem, even when a processor core of the first microprocessor subsystem is not responsive to any signal;
bi-directionally communicating to and from at least one peripheral bus of the first microprocessor subsystem:
receiving communications by a first multi-channel link of the inter-processor communication link from the at least one peripheral bus of the first microprocessor subsystem:
transmitting communications by a second multi-channel link of the inter-processor communication link to the at least one peripheral bus of the first microprocessor subsystem; and
receiving a communication used to perform the management function by a predetermined channel of an inbound link of the inter-processor communication link.

11. The method according to claim 10, further comprising:
controlling data flow over first and second multi-channel links of an inter-processor communication link.

12. The method according to claim 10, further comprising:
storing command data delivered through an inter-processor communication link in a command register; and
storing response data from the microprocessor bus in a response register.

13. The method according to claim 12, further comprising:
determining by a manageability control device when the command data is received at the command register;
transmitting a command signal associated with the command data over the microprocessor bus;
receiving a response signal from the microprocessor bus;
storing a response data associated the response signal at the response register; and
transmitting the corresponding response data through the inter-processor communication link.

14. The method according to claim 13, further comprising:
performing by the command signal the management function for the first microprocessor subsystem.

15. The method according to claim 10, wherein the management function includes at least one of debugging, accessing a memory, accessing configuration registers, and accessing a peripheral device of the first microprocessor subsystem.

* * * * *